(12) United States Patent
Miklos et al.

(10) Patent No.: US 10,990,833 B2
(45) Date of Patent: Apr. 27, 2021

(54) METHOD FOR DETERMINING A COURSE OF LANES, DRIVER ASSISTANCE SYSTEM, AND VEHICLE

(71) Applicant: Continental Automotive GmbH, Hannover (DE)

(72) Inventors: Mihai Miklos, Timisoara (RO); Camelia Hirean, Timisoara (RO); Larisa Ana-Maria Schinteie, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 55 days.

(21) Appl. No.: 16/348,255

(22) PCT Filed: Nov. 8, 2017

(86) PCT No.: PCT/EP2017/078517
§ 371 (c)(1),
(2) Date: May 8, 2019

(87) PCT Pub. No.: WO2018/091316
PCT Pub. Date: May 24, 2018

(65) Prior Publication Data
US 2019/0318174 A1    Oct. 17, 2019

(30) Foreign Application Priority Data
Nov. 16, 2016  (EP) .................................... 16465555

(51) Int. Cl.
*G06K 9/00*     (2006.01)
*G06T 7/70*     (2017.01)
(Continued)

(52) U.S. Cl.
CPC ....... *G06K 9/00798* (2013.01); *B60W 40/072* (2013.01); *G06T 7/70* (2017.01); *G08G 1/167* (2013.01); *G06T 2207/30256* (2013.01)

(58) Field of Classification Search
CPC combination set(s) only.
See application file for complete search history.

(56) References Cited

U.S. PATENT DOCUMENTS 6,850,841 B1 *  2/2005  Casino .................... G01C 21/26
                                                    340/995.1
8,195,394 B1 *  6/2012  Zhu ........................ G01C 21/26
                                                    701/514

(Continued)

FOREIGN PATENT DOCUMENTS

EP        3 285 243        2/2018

OTHER PUBLICATIONS

European, European Office Action in European Patent Application No. 16 465 555.7, dated Dec. 16, 2019, 6 pages.
(Continued)

*Primary Examiner* — Iman K Kholdebarin
(74) *Attorney, Agent, or Firm* — W. F. Fasse

(57) ABSTRACT

In a method for determining a course of lanes (L1, L2) of a road for a vehicle, a distance (D1-D3) of at least one lane boundary (B1-B3, N1-N3) of at least one lane (L1, L2) from a predetermined point of the vehicle (V) is determined (S1). Further, a course of the at least one lane boundary (B1-B3, N1-N3) is predicted (S2) based on information about a course of the road obtained from a database (DB) and based on the determined distance (D1-D3).

17 Claims, 5 Drawing Sheets

(51) Int. Cl.
*B60W 40/072* (2012.01)
*G08G 1/16* (2006.01)

(56) References Cited

U.S. PATENT DOCUMENTS

| | | | | |
|---|---|---|---|---|
| 9,494,438 | B1 | 11/2016 | Ichinokawa | |
| 10,002,537 | B2 * | 6/2018 | Chen | G08G 1/0133 |
| 2009/0326752 | A1 * | 12/2009 | Staempfle | G08G 1/167 |
| | | | | 701/31.4 |
| 2010/0286899 | A1 * | 11/2010 | Jain | G08G 1/127 |
| | | | | 701/119 |
| 2011/0040468 | A1 * | 2/2011 | Leineweber | G08G 1/163 |
| | | | | 701/96 |
| 2013/0173232 | A1 * | 7/2013 | Meis | G08G 1/167 |
| | | | | 703/2 |
| 2014/0029852 | A1 * | 1/2014 | Pisipati | G06T 7/13 |
| | | | | 382/182 |
| 2014/0118182 | A1 * | 5/2014 | Oh | G01S 13/931 |
| | | | | 342/52 |
| 2015/0206017 | A1 * | 7/2015 | Sakamoto | G08G 1/167 |
| | | | | 382/103 |
| 2016/0167582 | A1 * | 6/2016 | Chen | G01C 21/32 |
| | | | | 348/148 |

OTHER PUBLICATIONS

PCT, International Search Report of the International Searching Authority for International Application PCT/EP2017/078517, dated Feb. 13, 2018, 3 pages, European Patent Office, HV Rijswijk, Netherlands.

PCT, PCT International Written Opinion of the International Searching Authority for International Application PCT/EP2017/078517, dated Feb. 13, 2018, 6 pages, European Patent Office, HV Rijswijk, Netherlands.

European, Extended European Search Report and Examination Report for European Patent Application No. 16 465 555.7, dated May 24, 2017, 7 pages, European Patent Office, Munich, Germany.

Johannes Rabe et al., "Ego-Lane Estimation for Lane-Level Navigation in Urban Scenarios", 2016 IEEE Intelligent Vehicles Symposium (IV), Gothenburg, Sweden, Jun. 19-22, 2016, XP032939072, pp. 896 to 901, DOI: 10.1109/IVS.2016.7535494.

Dominique Gruyer et al., "Map-Aided Localization with Lateral Perception", 2014 IEEE Intelligent Vehicles Symposium (IV), Dearborn, Michigan, USA, Jun. 8-11, 2014, XP032620378, pp. 674 to 680, DOI: 10.1109/IVS.2014.6856528.

* cited by examiner

METHOD FOR DETERMINING A COURSE OF LANES, DRIVER ASSISTANCE SYSTEM, AND VEHICLE

FIELD OF THE INVENTION

The invention relates to a method for determining a course of lanes of a road for a vehicle, a driver assistance system for a vehicle for determining a course of lanes of a road, and a vehicle.

BACKGROUND INFORMATION

Navigation systems provide information about the course of the roads in the surrounding of the vehicle. However, current digital maps do not provide information about the width of the road or of the precise course of the individual lanes themselves. The lane width itself is not uniform, but can vary based on the specific road. Typically, the widths of vehicle lanes vary from 2.7 m to 4.6 m. On low volume roads, the lane width is usually narrower whereas the width may increase on a curve.

For modern driver assistance systems, a precise knowledge of both the exact course of the road and the exact width of the lanes is required to perform driving functions such as a lane-change maneuver or an overtaking maneuver. The lane width is of special importance to oversized vehicles which can only drive on lanes having a certain minimal width. In this case, the driver assistance system must plan the route in such a way that roads are avoided which are too narrow.

SUMMARY OF THE INVENTION

Accordingly, it is an object of the present invention to provide more precise and detailed map data.

This problem is solved by a method for determining a course of lanes of a road for a vehicle, a driver assistance system for a vehicle for determining a course of lanes of a road, and a vehicle, respectively according to the invention as set forth herein.

According to one aspect, therefore, the invention provides a method for determining a course of lanes of a road for a vehicle. A distance of at least one lane boundary of at least one lane of the road from a predetermined point of the vehicle is determined.

Further, a course of the at least one lane boundary is predicted based on information about a course of the road obtained from a database and based on the determined distance.

The predetermined point of the vehicle can correspond to a predetermined point of the mudguard of the vehicle, a predetermined point of a window or of the chassis of the vehicle or, preferably, to a location of a sensor of the vehicle, such as a camera sensor or a radar sensor.

Preferably, a distance refers to the minimal distance between the lane boundary and the predetermined point of the vehicle. The distance can also refer to a distance measured under a certain angle with respect to a driving direction of the vehicle or with respect to the road direction of the road. For instance, the distance can be determined under a predetermined angle in the range between 30 and 80 degrees relative to the road direction.

A lane boundary can comprise a road marking, a guardrail, a curb or vegetation along the road, such as grass or trees.

The course of the road comprises information about the specific directions of the road, such as a curve shape of the road or a bending of the road. Preferably, the course of the road is provided as a series of connected lines, i.e., a polygon chain.

According to another aspect of the invention, a driver assistance system for a vehicle is provided for determining a course of lanes of a road. The driver assistance system comprises a distance determination unit which is adapted to determine a distance of at least one lane boundary of at least one lane of the road from a predetermined point of the vehicle.

The driver assistance system further comprises a processing unit which is adapted to predict a course of the at least one lane boundary based on information about a course of the road obtained from a database and based on the determined distance.

According to a further aspect of the invention, a vehicle is provided, comprising a driver assistance system.

The invention combines two aspects, namely the determination of distances of lane boundaries, which allows providing information about the exact current location and orientation of the lane boundaries, together with a known course of the road which is stored in the database. In this way, the precise course of the lane boundaries and therefore of the lanes themselves can be determined and predicted. The driver of the vehicle or a driver assistance system of the vehicle obtains information about both the exact width of the lanes and of the exact course of the lanes. This information can be used to perform automatic driving functions, for instance by a lane-change assistant, an overtaking assistant or a lane-keeping assistant. The safety of the performed driving functions is greatly enhanced because the entire form of the lanes including both the direction and the width of the lanes is known. It can be determined with a higher precision if a certain driving maneuver is safe to be performed.

According to a further embodiment, the distance is determined based on camera data provided by a camera of the vehicle. Preferably, the vehicle can comprise a surround view system which allows determining the exact position and distance of all lanes around the vehicle. According to another embodiment, the distance can also be determined based on a radar system, which can in particular be adapted to measure the distance to guardrails or to curbs along the road. According to this embodiment, preferably the distance to outer lane boundaries is determined based on the radar or camera information data, wherein the distance to inner lane boundaries is determined based on the distance to the outer lane boundaries in combination with information about a lane width which can be stored in and obtained from the database. For instance, a standard lane width can be stored in the database. Further, a number of lanes can be stored in the database and the lane width and in this way also the distance to inner lane boundaries can be determined by dividing the total distance between the outer lane boundaries by the number of lanes.

According to a further embodiment, a lane width of the at least one lane is determined based on the camera data. The lane width can be determined based on the distances between two adjacent lane boundaries from the predetermined point of the vehicle.

According to another embodiment, a number of lanes is recognized based on the camera data.

According to a further embodiment, the recognized number of lanes is compared to a number of lanes of the road obtained from the database. If the number of recognized lanes is smaller than the number of lanes obtained from the database, a lane width of an unrecognized lane is determined based on a lane width of the nearest recognized lane. For instance, an outer lane boundary can be identified based on radar or camera data. For instance, a curb or guardrails can be determined to be an outer lane boundary. If the number of lanes which have been identified or recognized is smaller than the number of lanes obtained from the database, additional lanes are added on a side opposite to the recognized outer lane boundary. The lane width of these unrecognized lanes is then determined based on the lane width of the nearest recognized lane. According to a further embodiment, the lane width of unrecognized lanes can also be determined based on an average lane width stored in the database.

According to another embodiment of the method, the course of the lane boundary is predicted further based on a current lane boundary. The current lane boundary is determined by obtaining a current road direction of the road from the database, and by constructing the current lane boundary in such a way that its distance from the predetermined point of the vehicle is equal to the determined distance of the lane boundary from the predetermined point of vehicle. The direction of the current lane boundary is chosen to correspond to the obtained current road direction.

According to a further embodiment, the course of the lane boundary is predicted based on a subsequent lane boundary. The subsequent lane boundary is determined by obtaining a distance of a direction change point from the predetermined point of the vehicle and a direction change angle from the database, and by constructing the subsequent lane boundary such that its distance to the direction change point is equal to the determined distance of the corresponding lane boundary to the predetermined point of the vehicle. Further, the subsequent lane boundary and the corresponding current lane boundary form an angle equal to the direction change angle. A direction change angle corresponds to an angle between a current direction and a future direction beyond the direction change point. Preferably, the information about the course of the road comprises a plurality of direction change points with respective direction change angles and the road is thus approximated by a polygon chain.

According to another embodiment, a distance of the direction change point from the predetermined point of the vehicle is determined further based on GPS coordinates of the vehicle. The precise location of the vehicle is determined based on the GPS coordinates and the distance of the direction change point is then obtained from the database relative to the current position of the vehicle.

According to a further embodiment of the method, the lane boundary is predicted by combining a segment of the current lane boundary up to an intersection with the subsequent lane boundary, and a segment of the subsequent lane boundary after the intersection with the current lane boundary. Thus, the lane boundary is constructed in a stepwise manner by combining specific segments.

According to a further embodiment of the method, the predicted course of the at least one lane boundary is uploaded to the database. In this way, the database is continuously completed by new information gathered from the vehicles on the road. By providing this information to vehicles without a distance determining system, also these other vehicles can benefit from exact information about the course of the lanes and the road.

According to a further embodiment of the driver assistance system, the distance determination unit comprises a camera device of the vehicle adapted to provide camera data.

According to another embodiment of the driver assistance system, the database is part of the driver assistance system.

According to a further embodiment, the driver assistance system comprises a control unit which is adapted to control at least one driving function of the vehicle based on the determined course of the lane. The control unit may accelerate or decelerate the vehicle or may change a steering angle of the vehicle. The control unit may comprise a lane-changing assistant, a lane-keeping assistant, or an overtaking assistant.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION OF EXAMPLE EMBODIMENTS OF THE INVENTION

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
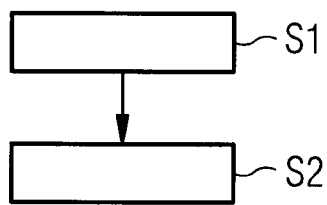
FIG. 1 shows a flowchart illustrating a method for determining a course of lanes of a road for a vehicle.

FIG. 1 shows a flowchart illustrating a method for determining a course of lanes of a road for a vehicle. The method is illustrated in the following with reference to the exemplary scenario shown in FIGS. 2 to 5.

Figure 2:
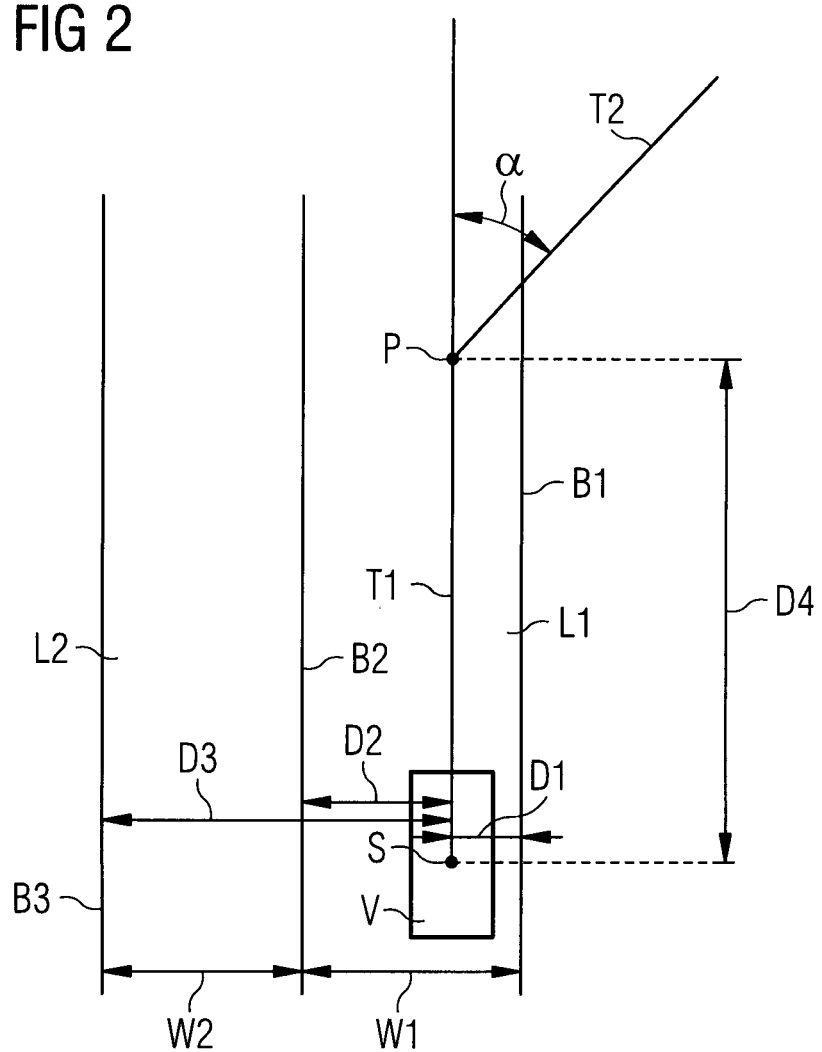
FIG. 2 shows a schematic top view on an illustrative scenario for determining a course of lanes, wherein a direction change point is determined.

In FIG. 2, a vehicle V is shown in a top view driving on a road with a first lane L1 and a second lane L2. The vehicle comprises a sensor device S, which preferably comprises at least one vehicle camera, radar system, lidar system and/or infrared sensor. The sensor device S forms a predetermined point of the vehicle which serves as a reference point for determining distances. However distances can also be determined with respect to another predetermined point of the vehicle V.

In a first step S1, a distance of lane boundaries of the first lane L1 and the second lane L2 from the sensor S of the vehicle V is determined. For instance, a first minimal distance D1 of a first lane boundary B1 which forms a right lane boundary of the first lane L1 is determined based on camera data obtained from the vehicle camera. Similarly, a second minimal distance D2 to a second lane boundary B2, which is a left boundary of the first lane L1 and a right boundary of the second lane L2, as well as a third minimal distance D3 to a third lane boundary B3, which forms a left boundary of the second lane L2, are determined based on the camera data provided by the sensor device S.

From the determined distances D1 to D3 between the lane boundaries B1 to B3 from the location of the sensor S, a width W1 of the first lane L1 is computed by adding the first distance D1 and the second distance D2 and a width W2 of the second lane L2 is computed by subtracting the second distance D2 from the third distance D3. Further, a number of lanes is recognized based on the camera data to be equal to two, namely the number of recognized lane boundaries minus 1.

In a second step S2, a course of the lane boundaries B1 to B3 is predicted based on information about a course of the road obtained from a database and based on the determined distances D1 to D3.

The database can be locally stored in a memory of a driver assistance system of the vehicle, but can also be provided via a remote connection to the vehicle.

A current road direction of the road is obtained from the database. The current road direction comprises information about an orientation of the road with respect to the orientation of the vehicle. However, the orientation of the road does not comprise the width of individual lanes but only provides a one-dimensional trajectory giving the general course of the road, for instance of a middle of the road.

In the scenario of FIG. 2, it is determined that the direction of the road is parallel to a current trajectory T1 of the vehicle V. Current lane boundaries B1 to B3 are constructed within a road model in such a way that a distance between the current lane boundary B1 to B3 within the road model to the sensor device S is equal to the determined distance D1 to D3 between the sensor device S and the respective actual lane boundary B1 to B3. Further, the direction or orientation of the current lane boundary B1 to B3 corresponds to the obtained current road direction. In this way, the current lane boundaries B1 to B3 are constructed as lines parallel to the current road direction corresponding in this case to the current trajectory T1 of the vehicle V.

Further, direction change points P are stored in the database and a distance D4 to the closest direction change point P in a direction in front of the vehicle V is determined, based on current GPS coordinates of the vehicle V and the specific location of the direction change point P in a map stored in the database. Further, a direction change angle α is associated with each direction change point P and stored in the database. The direction change angle α denotes the angle between a current direction T1 and a subsequent direction T2 of the road after the direction change point P, which in the illustrated scenario corresponds to a future trajectory of the vehicle V. The direction change angle α corresponding to the direction change point P is gathered from the database.

Figure 3:
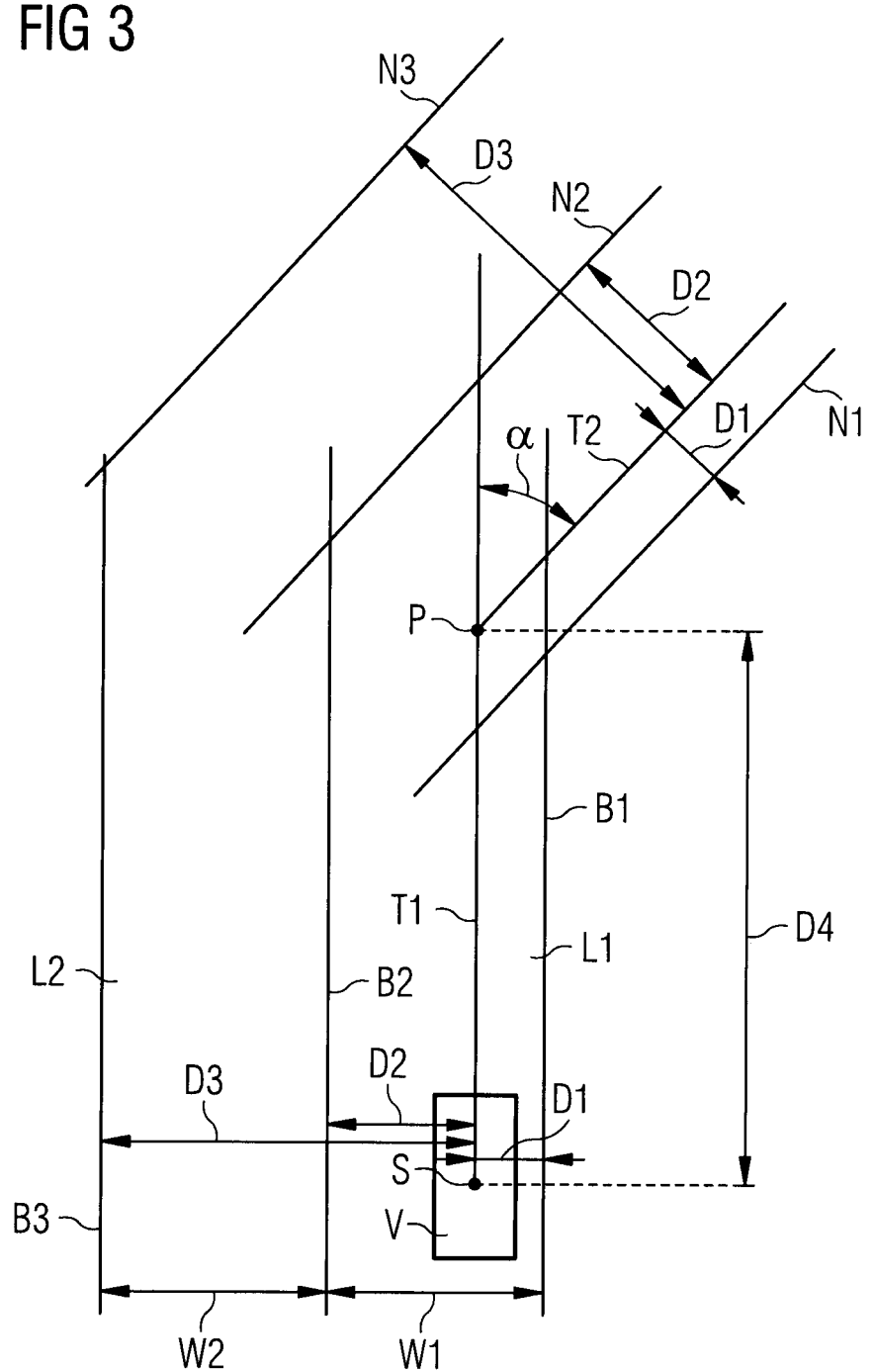
FIG. 3 shows the scenario of FIG. 2, wherein subsequent lane boundaries are constructed.

As shown in FIG. 3, subsequent lane boundaries N1 to N3 of the road model are constructed in such a way, that a distance between the direction change point P and the subsequent lane boundary N1 to N3 is equal to the determined distance D1 to D3 of the corresponding current lane boundary B1 to B3 to sensor device S of the vehicle V.

Figure 4:
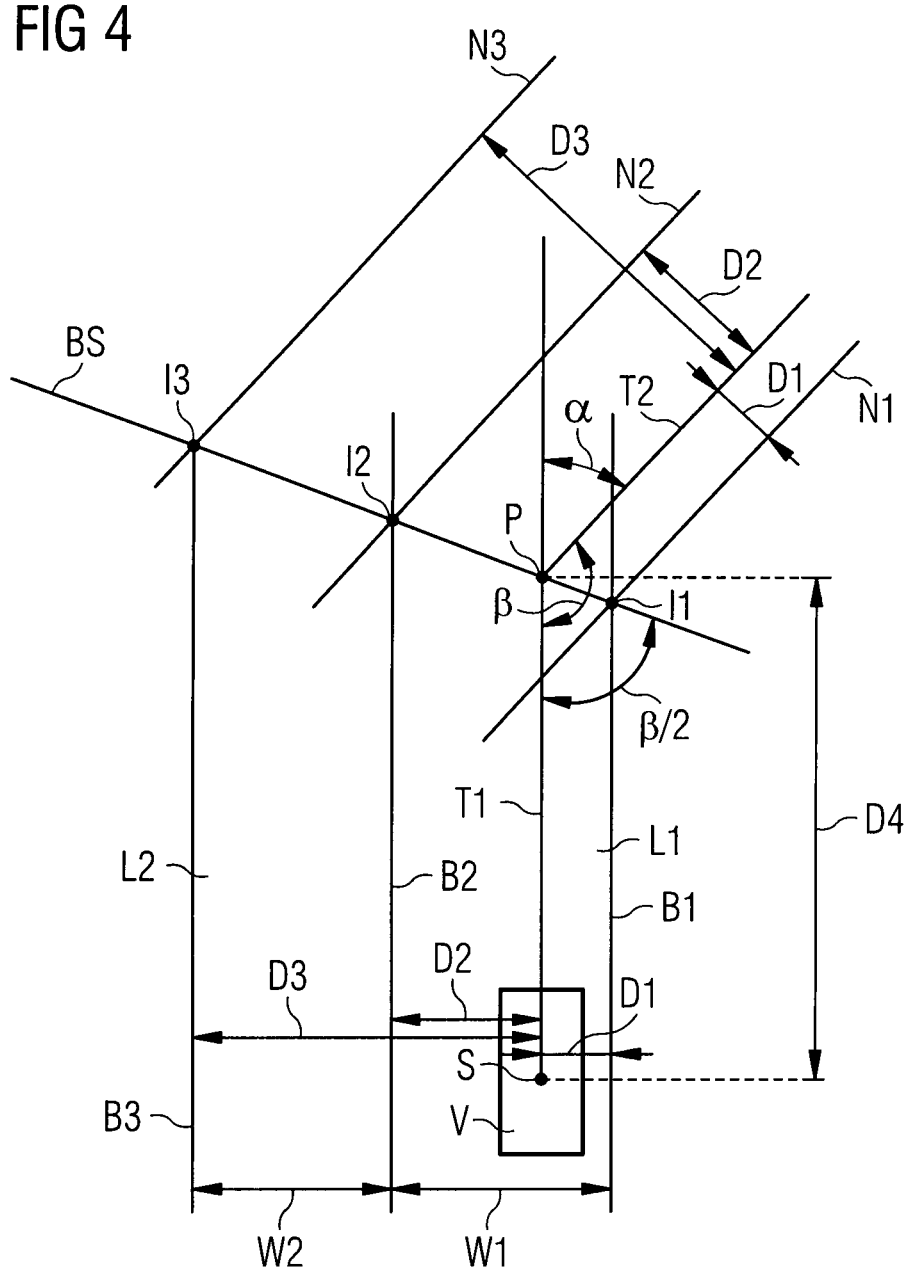
FIG. 4 shows the scenario of FIGS. 2 and 3, wherein the intersection points between current lane boundaries and subsequent lane boundaries are determined.

As shown in FIG. 4, in a further step intersection points I1 to I3 between the current lane boundaries B1 to B3 and the subsequent lane boundaries N1 to N3 are determined. The intersection points can also be determined by constructing a bisector BS, forming an angle β/2 with the current road direction T1 which is equal to half the angle β which adds up with the direction change angle α to 180 degrees. The bisector BS runs through the direction change point P.

Figure 5:
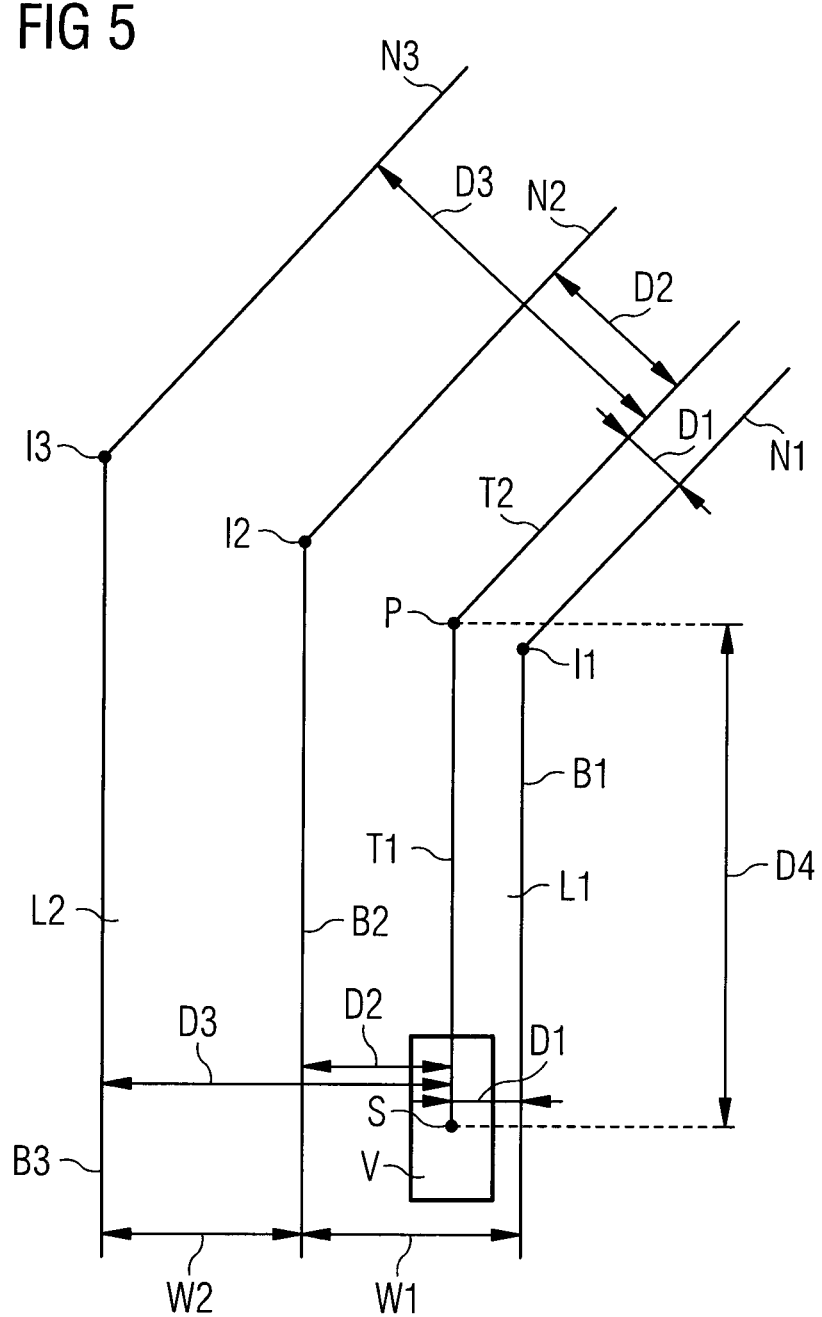
FIG. 5 shows the scenario of FIGS. 2 to 4, wherein the determined course of the lanes is illustrated.

As shown in FIG. 5, the course of the lanes L1, L2 is determined by determining the course of the lane boundaries, wherein the lane boundaries are obtained by combining in a piecewise manner the current lane boundaries B1 to B3 and the subsequent lane boundaries N1 to N3. A portion of the current lane boundary B1 to B3 up to a respective intersection point I1 to I3 is used to construct the lane boundary, whereas starting from the respective intersection point I1 to I3, a segment of the subsequent lane boundary N1 to N3 is used.

Preferably, the method is repeated for a plurality of direction change points to construct the precise course of the lane boundaries of the lanes L1, L2. It is to be noted that a bending of the road is approximated by a series of direction change points P with respective direction change angles α.

Preferably, the predicted course of the lane boundaries B1 to B3 is uploaded to the database.

Figure 6:
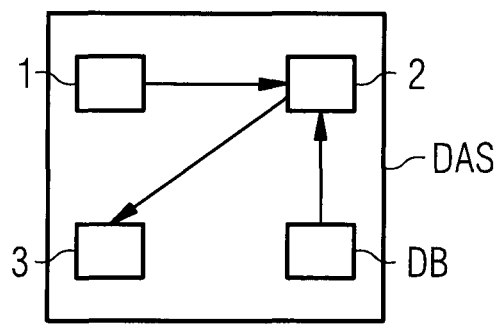
FIG. 6 shows a block diagram of a driver assistance system for a vehicle according to an embodiment of the invention.

FIG. 6 shows a block diagram of a driver assistance system DAS for a vehicle V for determining a course of lanes L1, L2 of a road. The driver assistance system comprises a distance determination unit 1 which is adapted to determine a distance of at least one lane boundary of at least one lane L1, L2 of the road from a predetermined point of the vehicle V, such as the sensor device S. The distance determination unit 1 can comprise a camera which provides camera data and the distance determination unit 1 can be adapted to extract the distances from the camera data. The distance determination unit 1 can also comprise a radar system which can determine the distance to curbs or to guardrails in the surroundings of the vehicle.

The driver assistance system DAS further comprises a processing unit 2 which is adapted to predict a course of the at least one lane boundary based on information about a course of the road obtained from a database DB and based on the determined distance. The processing unit 2 can be adapted to construct current lane boundaries B1 to B3 and subsequent lane boundaries N1 to N3 based on the method described with respect to FIGS. 2 to 5. As shown in FIG. 6, the database DB can be part of the driver assistance system DAS and can be stored locally in a memory of the driver assistance system DAS.

The driver assistance system preferably further comprises a control unit 3 which is adapted to control at least one driving function of the vehicle V based on the determined course of the lane L1, L2. The control unit 3 may change a speed or a steering angle of the vehicle V based on the determined course of the lanes L1, L2.

Figure 7:
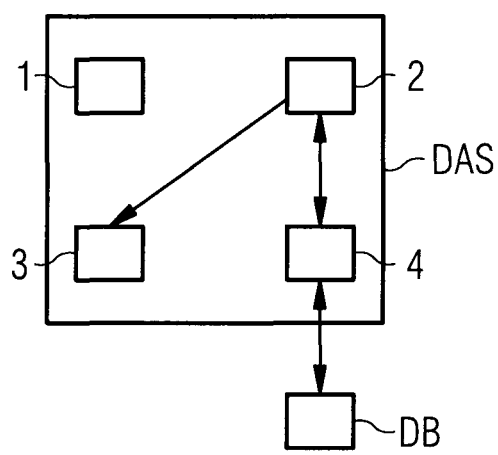
FIG. 7 shows a driver assistance system for a vehicle according to another embodiment of the invention.

According to a further embodiment, as shown in FIG. 7, the driver assistance system DAS comprises an interface 4 which is connected via a remote connection with a database DB on an external server, wherein the interface 4 provides information from the database to the processing unit 2. Preferably, the predicted course of the lanes or lane boundaries can be provided by the processing unit 2 to the database DB via the interface 4.

Figure 8:
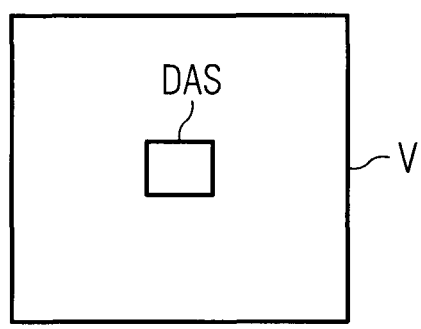
FIG. 8 shows a block diagram of a vehicle according to an embodiment of the invention.

FIG. 8 shows a block diagram of a vehicle V comprising a driver assistance system DAS for determining a course of lanes L1, L2 of a road, which may be configured according to one of the above described embodiments.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A method of determining a course of lanes of a road for a vehicle, comprising the following steps:
   determining a distance of at least one lane boundary of at least one lane of the road from a predetermined point of the vehicle;
   predicting a course of the at least one lane boundary based on information about a course of the road obtained from a database and based on the determined distance;
   based on camera data provided by a camera of the vehicle, recognizing a first number of lanes included in the at least one lane of the road;
   obtaining a second number of lanes of the road from the database;
   comparing the recognized first number of lanes to the obtained second number of lanes; and
   when the comparing determines that the recognized first number of lanes is smaller than the obtained second number of lanes, then determining a lane width of an unrecognized lane based on a lane width of a nearest recognized lane.

2. The method according to claim 1, wherein the determined distance is determined based on the camera data.

3. The method according to claim 1, wherein a respective lane width of the at least one lane is determined based on the camera data.

4. The method according to claim 1, wherein the course of the at least one lane boundary is predicted further based on a current lane boundary that is determined using the following steps:
   from the database obtaining a current road direction of the road; and
   constructing the current lane boundary having a distance to the predetermined point of the vehicle equal to the determined distance and having a direction corresponding to the obtained current road direction.

5. The method according to claim 4, wherein the course of the at least one lane boundary is predicted further based on a subsequent lane boundary that is determined using the following steps:
   from the database obtaining a distance of a direction change point from the predetermined point of the vehicle, and a direction change angle; and
   constructing the subsequent lane boundary having a distance to the direction change point equal to the determined distance of a corresponding lane boundary among the at least one lane boundary to the predetermined point of the vehicle, and wherein the subsequent lane boundary and the current lane boundary form an angle equal to the direction change angle.

6. The method according to claim 5, wherein the distance of the direction change point from the predetermined point of the vehicle is determined further based on GPS coordinates of the vehicle.

7. The method according to claim 5, wherein the course of the at least one lane boundary is predicted by combining a segment of the current lane boundary up to an intersection with the subsequent lane boundary, and a segment of the subsequent lane boundary after the intersection with the current lane boundary.

8. The method according to claim 1, further comprising uploading the predicted course of the at least one lane boundary to the database.

9. A driver assistance system for a vehicle for determining a course of lanes of a road, comprising:
   a distance determination unit configured to determine a distance of at least one lane boundary of at least one lane of the road from a predetermined point of the vehicle;
   a processing unit that is configured:
      to predict a course of the at least one lane boundary based on information about a course of the road obtained from a database and based on the determined distance,
      to recognize a first number of lanes included in the at least one lane of the road based on camera data provided by a camera of the vehicle;
      to obtain a second number of lanes of the road from the database;
      to compare the recognized first number of lanes to the obtained second number of lanes; and
      when the comparing determines that the recognized first number of lanes is smaller than the obtained second number of lanes, then to determine a lane width of an unrecognized lane based on a lane width of a nearest recognized lane.

10. The driver assistance system according to claim 9, wherein the distance determination unit comprises a camera device of the vehicle configured to provide the camera data.

11. The driver assistance system according to claim 9, wherein the database is part of the driver assistance system.

12. The driver assistance system according to claim 9, further comprising a control unit configured to control at least one driving function of the vehicle based on the predicted course of the at least one lane boundary.

13. A combination comprising a vehicle and a driver assistance system according to claim 9.

14. A method of determining a course of lanes of a road for a vehicle, comprising the following steps:
   determining a distance of at least one lane boundary of at least one lane of the road from a predetermined point of the vehicle; and
   predicting a course of the at least one lane boundary based on information about a course of the road obtained from a database, and based on the determined distance, and based on a current lane boundary that is determined using the following steps:
   from the database obtaining a current road direction of the road; and
   constructing the current lane boundary having a distance to the predetermined point of the vehicle equal to the determined distance and having a direction corresponding to the obtained current road direction.

15. The method according to claim 14, wherein the course of the at least one lane boundary is predicted further based on a subsequent lane boundary that is determined using the following steps:
   from the database obtaining a distance of a direction change point from the predetermined point of the vehicle, and a direction change angle; and
   constructing the subsequent lane boundary having a distance to the direction change point equal to the determined distance of a corresponding lane boundary among the at least one lane boundary to the predetermined point of the vehicle, and wherein the subsequent lane boundary and the current lane boundary form an angle equal to the direction change angle.

16. The method according to claim 15, wherein the distance of the direction change point from the predetermined point of the vehicle is determined further based on GPS coordinates of the vehicle.

17. The method according to claim 15, wherein the course of the at least one lane boundary is predicted by combining a segment of the current lane boundary up to an intersection with the subsequent lane boundary, and a segment of the subsequent lane boundary after the intersection with the current lane boundary.

* * * * *